(12) United States Patent
Civanlar et al.

(10) Patent No.: US 8,502,858 B2
(45) Date of Patent: Aug. 6, 2013

(54) SYSTEM AND METHOD FOR MULTIPOINT CONFERENCING WITH SCALABLE VIDEO CODING SERVERS AND MULTICAST

(75) Inventors: Mehaet Reha Civanlar, San Francisco, CA (US); Alexandros Eleftheriadis, Tenafly, NJ (US); Ofer Shapiro, Fair Lawn, NJ (US)

(73) Assignee: Vidyo, Inc., Hackensack, NJ (US)

( * ) Notice: Subject to any disclaimer, the term of this patent is extended or adjusted under 35 U.S.C. 154(b) by 1264 days.

(21) Appl. No.: 11/865,478

(22) Filed: Oct. 1, 2007

(65) Prior Publication Data

US 2008/0239062 A1    Oct. 2, 2008

Related U.S. Application Data

(60) Provisional application No. 60/827,469, filed on Sep. 29, 2006.

(51) Int. Cl.
*H04N 7/14* (2006.01)

(52) U.S. Cl.
USPC ............ 348/14.08; 348/14.09; 348/14.12

(58) Field of Classification Search
USPC ............ 348/14.08, 14.09, 14.13; 370/235, 370/259, 260, 270; 709/203, 204, 217, 218, 709/219, 227, 228, 230, 233
See application file for complete search history.

(56) References Cited

U.S. PATENT DOCUMENTS

| | | | |
|---|---|---|---|
| 5,963,547 A | 10/1999 | O'Neil et al. | |
| 6,167,084 A | 12/2000 | Wang et al. | |
| 6,496,217 B1 | 12/2002 | Piotrowski | |
| 6,498,865 B1 | 12/2002 | Brailean et al. | |
| 7,082,164 B2 * | 7/2006 | Chaddha | 375/240.12 |
| 7,139,015 B2 | 11/2006 | Eshkoli et al. | |
| 7,461,126 B2 | 12/2008 | Berkeland et al. | |
| 7,477,281 B2 | 1/2009 | Chandra et al. | |
| 7,593,032 B2 | 9/2009 | Civanlar et al. | |
| 2002/0071485 A1 | 6/2002 | Caglar et al. | |
| 2003/0135631 A1 | 7/2003 | Li et al. | |
| 2004/0131115 A1 | 7/2004 | Burgess et al. | |
| 2004/0236829 A1 | 11/2004 | Xu et al. | |
| 2005/0021833 A1 * | 1/2005 | Hundscheid et al. | 709/236 |
| 2005/0024487 A1 | 2/2005 | Chen | |
| 2005/0063463 A1 | 3/2005 | Zhang et al. | |

(Continued)

FOREIGN PATENT DOCUMENTS

| | | |
|---|---|---|
| CN | 1263421 A | 8/2000 |
| CN | 1315118 A | 8/2001 |

(Continued)

OTHER PUBLICATIONS

Supplemental European Search Report for EP06788107.8, dated Jun. 8, 2011.

(Continued)

*Primary Examiner* — Melur Ramakrishnaiah
(74) *Attorney, Agent, or Firm* — Baker Botts LLP

(57) ABSTRACT

A multicast scalable video communication server (MSVCS) is disposed in a multi-endpoint video conferencing system having multicast capabilities and in which audiovisual signals are scalably coded. The MVCVS additionally has unicast links to endpoints. The MSVCS caches audiovisual signal data received from endpoints over multicast communication channels, and retransmits the data over either unicast or multicast communication channels to an endpoint that requests the cached data.

25 Claims, 8 Drawing Sheets

COMBINING THE SVCS ARCHITECTURE WITH MULTICAST

U.S. PATENT DOCUMENTS

| | | | |
|---|---|---|---|
| 2005/0132000 A1* | 6/2005 | Richardson et al. | 709/204 |
| 2005/0135477 A1 | 6/2005 | Zhang et al. | |
| 2005/0144284 A1* | 6/2005 | Ludwig et al. | 709/226 |
| 2005/0157164 A1 | 7/2005 | Eshkoli et al. | |
| 2005/0254575 A1 | 11/2005 | Hannuksela et al. | |
| 2005/0265450 A1 | 12/2005 | Raveendran et al. | |
| 2006/0023748 A1 | 2/2006 | Chandok et al. | |
| 2006/0146934 A1 | 7/2006 | Caglar et al. | |
| 2007/0121723 A1 | 5/2007 | Mathew et al. | |
| 2009/0219990 A1 | 9/2009 | Han et al. | |

FOREIGN PATENT DOCUMENTS

| | | |
|---|---|---|
| GB | 2384932 | 8/2003 |
| JP | 2002 534894 | 10/2002 |
| JP | 2004260362 A | 9/2004 |
| JP | 2005130428 A | 5/2005 |
| JP | 2005-229400 | 8/2005 |
| WO | WO03/065720 | 8/2003 |
| WO | WO2004/036916 | 4/2004 |
| WO | WO2005/009038 | 1/2005 |

OTHER PUBLICATIONS

"Packet-based multimedia communications systems; H.323 (11/00)"; ITU-T Standard Superseded (S), Intenrational Telecommunication Union, Geneva, CH; No. H.323 (11/00); Nov. 1, 2000, XP017401474, *paragraphs [3.18], [3.24], [3.33], [3.34], [3.46], [6.4], [9.6], [Annex B]*.

Gharavi et al., "Video coding and distribution over ATM for multipoint teleconferencing", Proceedings of the Global Communications Conference (Globecom), Houston, Nov. 29-Dec. 2, 1993; [Proceedings of the Global Communications Conference (Globecom)], New York, IEEE, US, vol. 2 of 4, pp. 1-7, Nov. 29, 1993, XP000428020.

Honda et al., "Proposal of applications and requirements for scalable video coding" ITU Study Group 16—Video Coding Experts Group—ISO/IEC MPEG & ITU-T VCEG (ISO/IEC JTC1/SC29/WG11 and ITU-T SG16 06); No. M9453, Mar. 3, 2003, XP030038369.

"Scalable video coding applications and requirements", ITU Study Group 16—Video Coding Experts Group—ISO/IEC MPEG & ITU-T VCEG (ISO/IEC JTC1/SC29/WG11 and ITU-T SG16 Q6), No. N6880, Jan. 21, 2005, XP030013600.

U.S. Appl. No. 11/615,643, filed Dec. 22, 2006.
U.S. Appl. No. 12/539,501, filed Aug. 11, 2009.
U.S. Appl. No. 12/015,945 (now US 7,593,032), filed Jan. 17, 2008 (Sep. 22, 2009).
U.S. Appl. No. 12/015,945, filed Jan. 17, 2008 Preliminary Amendment.
U.S. Appl. No. 12/015,945, filed Aug. 8, 2008 Non-Final Office Action.
U.S. Appl. No. 12/015,945, filed Nov. 10, 2008 Response to Non-Final Office Action.
U.S. Appl. No. 12/015,945, filed Mar. 6, 2009 Final Office Action.
U.S. Appl. No. 12/015,945, filed Apr. 15, 2009 Response to Final Office Action.
U.S. Appl. No. 12/015,945, filed May 13, 2009 Notice of Allowance.

(ITU-T H.264) "ITU Recommendation H.264: Advanced video coding for generic audiovisual services" in: International Telecommunication Union (on Line, URL:http://www.itu.int/rec/T-REC-H.264/en) Mar. 2005, entire document.

International Search Report and Written Opinion—PCT/US06/062569 (International Filing Date: Dec. 22, 2006).
International Search Report and Written Opinion—PCT/US06/028366 (International Filing Date: Jul. 21, 2006).
International Search Report and Written Opinion—PCT/US06/080089 (International Filing Date: Oct. 1, 2007).

U.S. Appl. No. 11/615,643, filed May 19, 2011 Non-Final Office Action.
Hannuksela, M.H., et al., "Coding of parameter sets" Joint Video Team (JVT) of ISO/IEC MPEG & ITU-T VCEG (ISO/IEC JTC1/SC29/WG11 and ITU-TSG16 Q.6) Document No. JVT-C078, May 6, 2002, URL, http://wftp3.itu.int.av-arch/jvt-site/2002_05_Fairfax/JVT-C078.doc.

U.S. Appl. No. 11/615,643, Oct. 27, 2011 Response to Non-Final Office Action.
U.S. Appl. No. 12/539,501, Oct. 20, 2011 Non-Final Office Action.
U.S. Appl. No. 12/539,501, May 25, 2012 Notice of Allowance.
U.S. Appl. No. 11/615,643, Jan. 31, 2012 Non-Final Office Action.
U.S. Appl. No. 12/539,501, Apr. 20, 2012 Response to Non-Final Office Action and Terminal Disclaimer.
U.S. Appl. No. 13/595,437, filed Aug. 27, 2012.
U.S. Appl. No. 11/615,643, Aug. 17, 2012 Notice of Allowance.
U.S. Appl. No. 11/615,643, Jul. 31, 2012 Response to Non-Final Office Action.
U.S. Appl. No. 11/615,643, Jan. 11, 2013 Notice of Allowance.
U.S. Appl. No. 13/595,437, Mar. 1, 2013 Non-Final Office Action.
Extended European Search Report for EP Application No. 07843617.7, dated May 8, 2013 (Corresponds to U.S. Appl. No. 11/865,478).
Maxemchuck, et al., "A Cooperative Packet Recovery Protocol for Multicast Video", *IEEE Comput. Soc. US*, pp. 259-266 (1997) (XP010258707).
Wenger, "Software Announcement: Mbone Tool Vic Supporting H.263 V.2", *ITU—Telecommunications Standardization Sector, Video Coding Experts Group (Question 15), Third Meeting: Eibsee, Bavaria, Germany*, Document No. Q15-C31, 1 page (1997), (XP030002734).
Wenger, "Simulation Results for H.263+ Error Resilience Modes K, R, N on the Internet", *ITU—Telecommunications Standardization Sector, Video Coding Experts Group (Question 15), Third Meeting: Eibsee, Bavaria, Germany*, Document No. Q15-D17, 22 pages (1998), (XP030002765).
ITU—T Telecommunication Standardization Sector of ITU, "Series H: Audiovisual and Multimedia Systems: Infrastructure of Audiovisual Services—System and Terminal Equipment for Audiovisual Services: ITU—T Recommendation H.323", 304 pages (2006).
McCanne, et al., "Receiver-Driven Layered Multicast", *Computer Communication Review*, 4:117-130 (1996) (XP002452811).
Eleftheriadis, et al., "Multipoint Videoconferencing with Scalable Video Coding", *Journal of Zhejiang University Science A*, 7(5):696-705 (2006).

* cited by examiner

FIG. 2: MSVCS operation on a multicast enabled enterprise network

FIG. 3: MSVCS operation on a multicast enabled enterprise network with multiple locations FIG. 4: MSVCS operation on a multi-site enterprise network with local multicast FIG. 5: MSVCS operation on a carrier managed multicast network FIG. 6: MSVCS operation on a multicast backbone with unicast enterprise networks FIG. 7: Multicast discovery example

FIG. 8:

Connectivity Table 800

|       | A | B | C | D | MSVCS |
|-------|---|---|---|---|-------|
| 1     |   | x |   | x | x     |
| 2     | x |   |   | x | x     |
| 3     |   |   |   | x | x     |
| 4     | x | x |   |   | x     |
| MSVCS | x | x | x | x | x     |

SYSTEM AND METHOD FOR MULTIPOINT CONFERENCING WITH SCALABLE VIDEO CODING SERVERS AND MULTICAST

CROSS-REFERENCE TO RELATED APPLICATIONS

This application claims the benefit of U.S. provisional patent application Ser. No. 60/827,469, filed Sep. 29, 2006. Further, this application is related to International patent application Nos. PCT/US06/28365, PCT/US06/028366, PCT/US06/061815, PCT/US06/62569, PCT/US07/062357, PCT/US07/65554, PCT/US07/065003, PCT/US06/028367, and PCT/US07/63335. All of the aforementioned applications, which are commonly assigned, are hereby incorporated by reference herein in their entireties.

FIELD OF THE INVENTION

The present invention relates to multimedia data communication systems. In particular, the invention, relates to multipoint video conferencing functionality enabled by using network supported multicast and scalable video conferencing servers together.

BACKGROUND OF THE INVENTION

In a multipoint video conference, it is desirable that compressed video data generated by each participant should be made available to every other participant who wants to receive it. Over a unicast network, this requires repeated transmissions of the same data to several participants/endpoints, either by each endpoint source or by a multipoint control unit (MCU). An MCU receives data generated by all the participants/endpoints and sends the data, usually as a mix, to the other participants/endpoints who want to receive it. Clearly, the bandwidth requirements for a video conference on the unicast network system increases in proportion to the number of conference participants.

When a network-supported multicast is available for a video conference, each endpoint can send its video data only once into a multicast group. Other endpoints that want to receive the data can join the multicast group. The network can establish optimized distribution trees to transport the multicast video data to the members of the multicast group using well-established techniques (e.g., the DVMRP protocol as described in RFC 1075).

In a receiver-driven layered multicast technique (see e.g., Receiver-driven layered multicast, Steven McCanne, Van Jacobson, Martin Vetterli, ACM SIGCOMM Computer Communication Review, Volume 26, Issue 4, Pages 117-130, October 1996, ISBN:0-89791-790-1), an MCU is not required and video data are encoded using a layered or scalable coding technique where each additional layer received increases the quality of the received video. Each layer is then sent to a separate multicast group by each endpoint, allowing each receiver to choose the bandwidth and the reception quality it receives from other participants by selecting the particular multicast groups it joins.

Although use of multicast techniques can result in efficient use of the network bandwidth for multipoint conferencing, a conferencing system architecture that depends solely on network supported multicast, i.e., without a specialized MCU, has several shortcomings:

1. Network supported multicast is not available on the global Internet. Thus, a purely multicast-based solution can not be used for global multipoint conferencing.
2. When multicast groups are managed locally on different networks that are not multicast connected to each other, a mapping between these multicast groups must be established.
3. Multicast group address management for two or more simultaneous conferences must be carried out jointly to eliminate potential address conflicts.
4. When packet data is lost by a receiving endpoint, re-multicasting the lost data from the source to the entire group of participants/endpoints is not efficient because other member endpoints will receive redundant information.
5. When a new participant joins a multicast group, the compressed video may not be decodable for the new participant because predictive encoding may be used for the compressed video.

Therefore, for efficient multipoint videoconferencing over partially or fully multicast supported networks, consideration is now being given to the design of a new multicast and scalable coding aware MCU or server.

SUMMARY OF THE INVENTION

The present invention provides systems and methods for performing multipoint videoconferencing that uses scalable digital video coding as well as multicast transmission capability of the underlying communication network. The combination of scalability and multicasting operates synergistically to overcome several limitations of current videoconferencing systems.

Designs for a new multicast and scalable coding aware MCU or server (hereinafter "Multicast Aware Scalable Video Coding Server (MSVCS) are provided.

The inventive methods may include localized unicast transmissions. The inventive methods exploit multicast transmissions for efficient use of bandwidth in the network, and at the same time exploit the use of localized unicast transmissions to minimize the bandwidth overhead associated with ancillary operations such as error recovery.

BRIEF DESCRIPTION OF THE DRAWINGS

Further features, the nature, and various advantages of the invention will be more apparent from the following detailed description of the preferred embodiments and the accompanying drawings in which:

FIG. 8 is an exemplary connectivity table, in accordance with the principles of the present invention.

Figure 1:
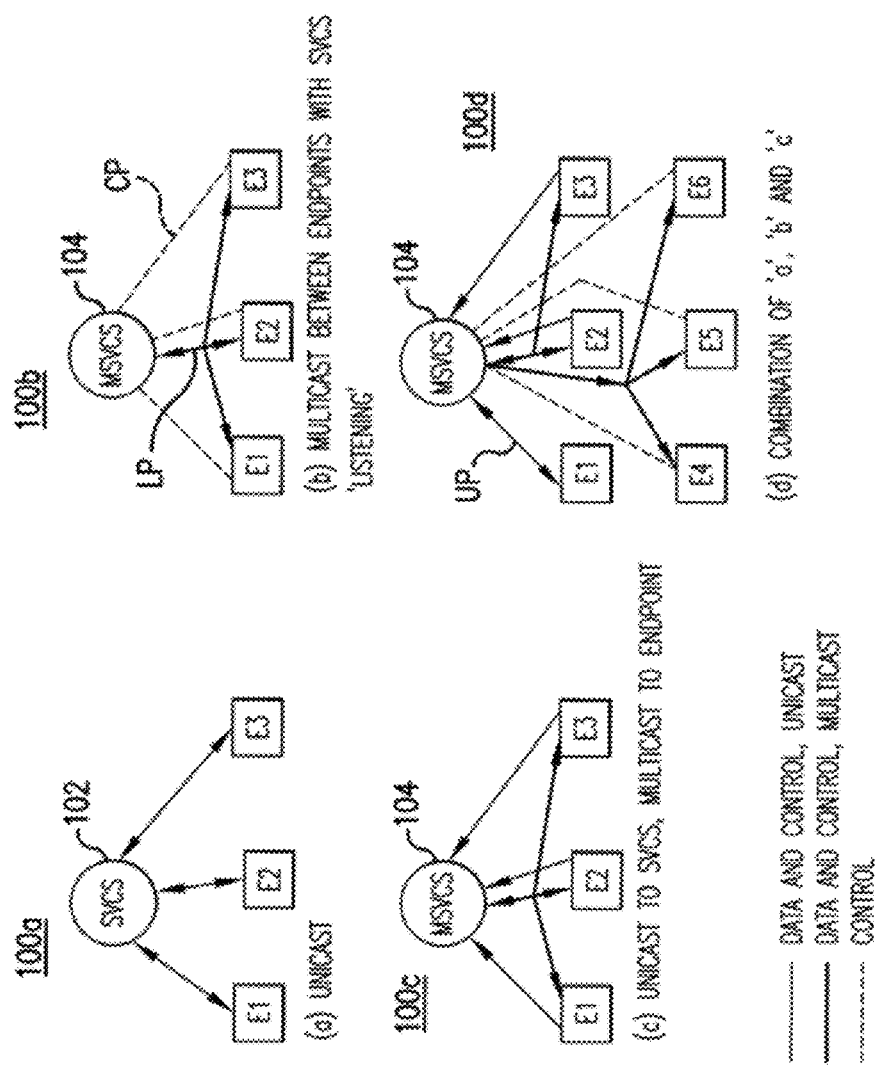
FIGS. 1a-1d are schematic illustrations of exemplary system configurations for combining the SVCS architecture with multicast, in accordance with the principles of the present invention.

Throughout the figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE INVENTION

The present invention combines the use of network-supported multicast functionality and the use of Scalable Video Conferencing Servers (SVCS) that enable video communications and multipoint conferencing based on Scalable Video Coding (SVC) techniques.

SVC is an encoding process in which a video stream is represented by a plurality of bitstreams that provide for the reconstruction of the original video stream at multiple spatial resolutions, frame rates, and picture qualities (SNR). The various reconstructions can be selected to account for differing CPU capabilities, display sizes, user preferences and bit rates in a computer network environment. SVC bitstreams are typically constructed in a pyramidal fashion, with a base layer stream and one or more enhancement layer streams. Decoding of an enhancement layer stream by itself cannot produce a faithful rendition of the original video stream. Instead, for proper decoding at a desired level of fidelity (e.g., in the spatial, temporal, or quality dimensions), access to at least the base layer stream and possibly other enhancement layer streams is necessary. Amendment 3 of the ITU-T H.264 International Standard, Annex G, provides an example of SVC. Further, International Patent Application. No. PCT/US06/28365 describes scalable video coding techniques specifically designed for video conferencing applications. Scalable coding techniques are also applicable to audio (see e.g., the ITU-T G.729.1 (G.729EV) standard). In the following, for convenience in description, a set of bitstreams, which collectively represent a given video source using SVC, may be referred to in the singular as an 'SVC stream.' It will be understood that an SVC stream will contain at least one bitstream (the base layer), and possibly one or more enhancement layer bitstreams. It will be further understood that, while the invention is described herein in the context of video transmissions, the inventive techniques are also applicable in the context of audio transmissions, which use scalable audio coding.

In a video conference, an SVC stream is transmitted from each endpoint to the SVCS. The transmission may be over two or more virtual or physical channels. Typically, but not necessarily, these different channels may offer different Quality of Service (QoS) levels. QoS support may be provided by the underlying communication network, or may be implemented at the application layer using well-known transport layer techniques (e.g., FEC, ARQ). Further, International Patent Application No. PCT/US06/061815 describes specific techniques for error-resilient transmission of scalable video, by which the lowest temporal level is guaranteed delivery via retransmissions without increasing the end-to-end delay of the system.

When different QoS levels are provided, assignment of SVC layers to different channels can take advantage of an increased reliability level by using it to transport the base layer and, if more bandwidth is available on that channel, also some of the enhancement layers. Assuming, without loss of generality, two virtual or physical channels are used, then a High Reliability Channel (HRC) includes basic picture quality information (base layer) and a Low Reliability Channel (LRC) includes enhancements to the picture (better quality, resolution or frame rate). The information is structured such that information loss on the LRC will result in only unsubstantial degradation of the picture quality. When no QoS is available from the underlying network or the application layer, assignment of SVC layers to different channels can be accomplished based on other considerations, as will be described hereinbelow. In such case, no particular channel is required to be identified as an HRC or LRC. In the following description, the notation 'CN', where N=0, 1, 2 . . . , indicates the various channels through which an SVC stream is transmitted or carried. The base layer of the coded video signal is always carried only on channel C0, which however may also carry other layers. When QoS is available, it will be further understood that C0 corresponds to the HRC.

In a video conference on a network using an SVCS, upon receiving the SVC stream from each participant's endpoint, the SVCS selects and transmits the necessary parts of each scalable video stream to each endpoint. An SVCS may appear as an endpoint to another SVCS, allowing cascading of servers if needed. Detailed information on methods and systems for the design of SVCS and SVCS-based communication systems is available, for example, in International Patent Application Nos. PCT/US06/028366, PCT/US06/061815, PCT/US06/62569, PCT/US07/63335, PCT/US07/062,357, PCT/US07/65554, PCT/US07/065,003, and PCT/US06/028367. It is noted that in the SVCS system described in PCT/US06/028366, the endpoint-to-SVCS, SVCS-to-SVCS, and SVCS-to-endpoint communications are all realized using point-to-point unicast transmission.

The present invention includes mechanisms by which the multicast capability of the underlying network can be utilized in the design of improved videoconferencing and other video communication systems. The present invention also includes mechanisms for applying the techniques described in International Patent Application Nos. PCT/US07/63335, PCT/US07/062,357, PCT/US07/65554, PCT/US07/065,003, and PCT/US06/028367 directly in a multicast-enabled system. These mechanisms are described one after another herein.

With respect to the mechanism for utilizing network multicast capability, it is noted that network-supported multicast has been considered since the beginning of the internet protocol (IP) based networks. However, its deployment on the Internet has been recent. The multicast IP addresses play an important role in establishing multicast applications over IP networks. In IPv4, a special group of addresses (i.e., class D addresses) are reserved as multicast IP addresses. Any endpoint can send packets to any one of these addresses. Other endpoints that want to receive these packets must explicitly indicate to their (multicast-enabled) routers that they want to receive the packets that are sent to this particular multicast address (commonly referred to as "joining" a multicast group). Similarly, the endpoints must also indicate to their routers when the want to stop receiving packets sent to this particular multicast address (commonly referred to as "leaving" a multicast group). Such indication may be accomplished by means of standard protocols such as the Internet Group Membership Protocol (IGMP).

In the IP networks, there is no central control that is responsible for the allocation of specific multicast addresses to be used by endpoints at any given time over the Internet. Therefore, this allocation task must be handled by local network management or by the endpoints themselves. S. Pejhan, A. Eleftheriadis, and D. Anastassiou, in "Distributed Multicast Address Management in the Global Internet," IEEE Journal on Selected Areas in Communications, Special Issue on the Global Internet, Vol. 13, Nr. 8, October 1995, pp. 1445-1456), provide a detailed analysis of the problem and also describe possible protocols for performing multicast address management. The present invention also includes techniques through which an MSVCS may "discover" the multicast structure of the network through which it is connected with its endpoints and other MSVCSs. These techniques are described herein with reference to FIG. 7.

At present, network supported multicast deployments are found in one of two forms: (1) a private enterprise multicast solution; and (2) a managed enterprise multicast solution, which is managed by an IP service provider. In either solution, an enterprise has multiple sites that are connected via either a unicast or multicast carrier backbone. In the private enterprise solution, multicast address allocations are made by the private enterprise network management. The private enterprise solutions are susceptible to multicast IP address conflict across several private (unmanaged) enterprise multicast networks. In contrast, in the managed enterprise multicast solution, the IP service provider manages the multicast address block and can provide a unique division of the multicast IP address space across subscribing multiple enterprise networks, thus avoiding the possibility of multicast IP address conflict.

The mechanisms of the present invention are described herein with reference to FIGS. 1-7. FIG. 1 shows the operation of the MSVCS within the context of an intranet with full or partial multicast support. The other figures show extensions to cover the more complex cases associated with private or managed enterprise solutions. It is assumed that MSVCS has available to it a set of multicast addresses (either through administrative assignment, interaction with a multicast address management entity, or discovery).

FIG. 1(a) shows a simple SVCS system 100a in which two or more endpoints (e.g., endpoints E1-E3) are connected to an SVCS 102 in a star configuration. (See e.g., PCT/US06/28365 and PCT/US06/028366). All endpoints E1-E3 transmit their video and audio data to SVCS 102, which in turn selects the appropriate information from each sender and forwards it to the intended recipients. In this configuration, the bit rate load on the SVCS is significant. With N participants each transmitting B Kbps, the total incoming rate is N·B Kbps. Further, assuming that every participant receives the entire streams from all other participants, the outgoing rate is N(N−1)B Kbps (i.e., a quadratic function of the number of participants N).

FIG. 1(b) shows an MSVCS system 100b, which is similar to SVCS system 100a except in that SVCS 102 is replaced by Multicast aware Scalable Video Coding Server (MSVCS) 104. In system 10b, endpoints E1-E3 communicate with each other directly using multicast. As shown in the figure, system 100b may be configured so that MSVCS 104 can also optionally receive the transmissions of the endpoints ('listening' on their multicast addresses) over listening path LP, with significant benefits for localizing error recovery as explained below. In the configuration of system 100b shown in FIG. 1(b), the main flows of video and audio data do not pass through MSVCS 104, and as a result the bit rate requirements on the server are minimized. Ignoring the listening path LP, there is no video or audio data flow on MSVCS 104. If flows over the listening path LP are considered, then the load on the server is only the N·B Kbps in the receive direction. There is no outgoing data traffic (except as described below). Hence, the quadratic (on the number of participants) dependency of the outgoing bandwidth is eliminated.

In the operation of system 100b, in which multicast transmission is used between the endpoints, each endpoint transmits its information to a set of multicast addresses that are particularly associated with it (i.e., the endpoint). MSVCS 104 informs each endpoint which multicast addresses to use through the unicast control paths CP that it establishes with each endpoint (see FIG. 1(b)). These same addresses are communicated to all other endpoints, so that if a receiving participant/endpoint desires reception from a particular transmitting endpoint, the receiving endpoint can subscribe or join (in IGMP terminology) the multicast group associated with the addresses of the transmitting endpoint. In order to add a particular SVC layer to its incoming video stream, the receiving endpoint simply joins the associated multicast group of the transmitting endpoint. Conversely, the receiving endpoint leaves the associated multicast group to drop the particular SVC layer from its incoming video stream.

It is possible to configure system 100b so that all endpoints E1-E3 transmit to a single set of addresses (i.e., a single multicast group). A limitation of this configuration is that each receiving endpoint will now have to receive corresponding video (or audio) layer data from either all or none of the other participants.

Either the transmitting endpoint itself or MSVCS 104 can decide how various SVC layers in the transmissions of the endpoint should be assigned to individual multicast groups. For example, if MSVCS 104 knows the minimum bit rate available to each endpoint, it can instruct endpoints to include in their C0 channel a sufficient number of temporal or quality layers so that the channel is fully utilized but not overloaded. Conversely, MSVCS 104 can instruct an endpoint to create an additional lower quality layer (e.g., with a lower frame rate), so that at least the base layer can be transmitted to all endpoints through C0.

It is noted that in some SVC system implementations, it is also possible to achieve points in quality that are in between the layers that are explicitly coded in the video bitstreams. (See e.g., International Patent Application Nos. PCT/US06/061815 and PCT/US07/63335). By receiving a subset of the enhancement layers and performing appropriate concealment, it is possible to obtain a 'fractional' quality level (from a PSNR point of view) that is between that of the quality of the base layer alone, or the base layer with the full enhancement layers. International Patent application No. PCT/US07/63335 describes an example of the transmission of L0, L1, L2, and S0 frames, with concealment-based recovery of the missing S1 and S0 frames. In a system 102b, which is configured for making use of such concealment-based recovery, MSVCS 104 can instruct an endpoint (e.g., through its unicast control channel CP) to create an additional "fractional" or intermediate quality multicast group to which it (the endpoint) will transmit only the appropriate partial portions of the enhancement layer(s). An endpoint that wishes to receive this intermediate quality can subscribe to the base layer channel and this partial enhancement multicast group. In such a system 100b, there will be a bit rate overhead if the full enhancement layer is simultaneously transmitted in its own multicast group, but such overhead will be small. This bit rate overhead may be eliminated by transmitting instead of the full enhancement layer only the difference between the full enhancement layer and the subset that is used to achieve the fractional quality to a separate multicast group.

A known drawback of multicast transmission systems is that if errors occur in transmission of a particular packet on a channel, a potential error-correcting or compensating retransmission from the source has to be transmitted again to all participants/endpoints, and not only to the endpoint(s) that did not receive the particular packet. While it is possible for the source endpoint to retransmit the missing packet using a unicast connection to a particular receiving endpoint that experienced the packet loss, in practice the distance (in network terms) between the source and the receiving endpoints can be significant. As a result, the retransmitted packet could arrive too late for display. The present invention includes a technique for error recovery services which overcomes this drawback. The technique involves delegating the responsibility of retransmission to the MSVCS instead of to the sending endpoints. For example, MSVCS 104 may be configured to listen to the transmissions of all endpoints, and cache all or some of the packets (e.g., 'R' packets, in the terminology of International Patent application No. PCT/US06/061815). When a receiving endpoint detects an error, it may then instruct MSVCS 104 to retransmit the missing/error packet over the receiving endpoint's unicast link to the MSVCS. The MSVCS then transmits the packet through the unicast link. MSVCS 104 does not normally transmit any outgoing video or audio data traffic, but instead only transmits when errors occur. Furthermore, the technique relieves the endpoints of the task of performing caching and retransmission.

This technique for error recovery services has excellent error localization properties, since MSVCS 104 is typically much closer (in network terms) to the receiving endpoint that experienced the error than the transmitting endpoint. Further, this technique has a lower bandwidth demand than the conventional retransmission-by-endpoint techniques. As an illustrative example, assume that each endpoint in system 100b has a probability of packet loss p ($0<p<1$). Then the average outgoing rate from MSVCS 104 to provide error recovery services will be $N \cdot B/(1-p)$ Kbps, which is the expected value for a Bernoulli random process. Even for values of p as high as 20%, the average outgoing bit rate from MSVCS 104 will be only 25% of the incoming bit rate. In contrast, in a traditional star configuration (e.g., with an SVCS), if errors are present, this same outgoing bit rate would still have to be added to the total.

An alternative configuration of system 100b for implementing a variation of this error-recovery scheme is shown in FIG. 1(c) as system 100c. In system 100c, the transmissions from the endpoints are unicast to MSVCS 104, followed by multicast transmission from MSVCS 104 to the endpoints. In this configuration, the total incoming bit rate to MSVCS 104 is identical to that in system 100b described above. The outgoing bit rate is identical to the incoming bit rate (ignoring possible retransmissions), and is still much lower than that of a star configuration (FIG. 1a) if the number of participants is greater than 2.

The operation of MSVCS 104 in system 100c is similar to SVCS 102 operation in system 100a. In system 100c, MSVCS 104 itself establishes a set of multicast groups through which the various SVC layers of the incoming video (and audio) will be transmitted. The similarity of operation of MSVCS 104 in the two systems is apparent upon considering each group of endpoints that join a particular multicast group as an 'aggregate' endpoint equivalent to the traditional single endpoints of an SVCS system (e.g., system 10a). MSVCS 104 in system 100c, like in system 10b, can perform rate matching by ensuring that the C0 group meets the minimum bit rate requirements of all recipients. Whereas an SVCS (e.g. SVCS 102) performs rate matching for each individual endpoint, the MSVCS performs rate matching for the 'aggregate' endpoint. An additional benefit of the system 100c configuration is that the MSVCS 104 can more easily perform statistical multiplexing, since all streams are combined at the MSVCS prior to their transmission to the endpoints. Further, like system 100b, 'fractional quality' multicast groups can be established in system 100c for improved rate matching and rate control ability, with similarly low bandwidth overhead as described above.

For example, assume that in system 100c endpoint E1 transmits to endpoint E3. The number of layers of endpoint E1 included in each multicast channel from MSVCS 104 will change depending on the available bit rate to E1-E3. The endpoints E1-E3, in other words, become an 'aggregate user,' which is treated by MSVCS 104 the same way that an individual endpoint would be treated by an SVCS. As in system 100b, MSVCS 104 can cache incoming packets and make them available for retransmission if errors are detected by the receiving endpoints. These retransmissions can occur on unicast channels between MSVCS 104 and the endpoints so that the bandwidth overhead associated with retransmissions is completely localized. Further, more complicated SVCS-based techniques for error resilience and rate control can be applied in system 100c in the same manner as they are applied in system 100b.

In general, all the error resilience, compositing, thinning and other techniques that are described in International Patent applications PCT/US06/061815, PCT/US07/63335, PCT/US07/65554, and PCT/US07/062,357 can be directly applied in the operation of the MSVCS. The only difference is that the MSVCS cases require consideration as to whether data transmission should be on the multicast channel or unicast. Advantageously, error recovery measures that address losses in a particular endpoint should be transmitted unicast. In a Compositing SVCS (see e.g., PCT/US06/62569), the transmission of the composed stream can be multicast. Similarly, in an SVCS that performs thinning (PCT/US07/062,357), a choice of multicast or unicast transmission of the thinned stream can be decided upon based on whether all receiving endpoints or only one endpoint has the appropriate channel for reception (high quality, with no or very small packet loss). In either case, the non-thinned stream can simultaneously exist alongside the thinned stream, in a separate multicast group. When transcoding is used at the SVCS (see e.g., PCT/US07/65554), it is typically done to accommodate a non-SVC endpoint (e.g., an H.264 AVC endpoint), and hence unicast transmission of the transcoded stream would be appropriate. If two or more such legacy endpoints are present in a system and are receiving a particular participant/endpoint transmission, then a separate multicast group can be established at the MSVCS for such legacy endpoints alone. In such a system, only a server-driven multicast configuration will apply here, as legacy endpoints—by definition—are not multicast aware.

It is noted that the system server and endpoint configurations shown in FIGS. 1a-1c can be merged or combined in any suitable manner. FIG. 1(d) shows an exemplary system 100d in which endpoint E1 uses unicast to communicate with the MSVCS 104 as in system 100a, endpoints E2 and E3 transmit unicast and receive multicast from MSVCS 104 as in system 100c, and endpoints E4-E6 all lie in a multicast cloud in which the MSVCS listens as in system 100b. In system 100d, in order to bridge the various transmission types or endpoints, MSVCS 104 also transmits to the multicast cloud of E4-E5 signals originating from E1 and E2-E3. In all other respects, the operation of each subset of endpoints (E1, E2-E3, E4-E5) in cooperation with MSVCS 104 is the same or similar to that in systems 100a-c as described above. Hereinafter, the terms "unicast," "endpoint-driven multicast" and "server-driven multicast" may be used to refer to systems of the types (e.g., systems 100a-100c) shown in FIGS. 1a-1c, respectively.

FIGS. 2-7 show systems with more complicated MSVCS configurations that are likely to be encountered in enterprise environments where multiple SVCSs (both multicast aware and non-multicast aware) may be employed.

Figure 2:
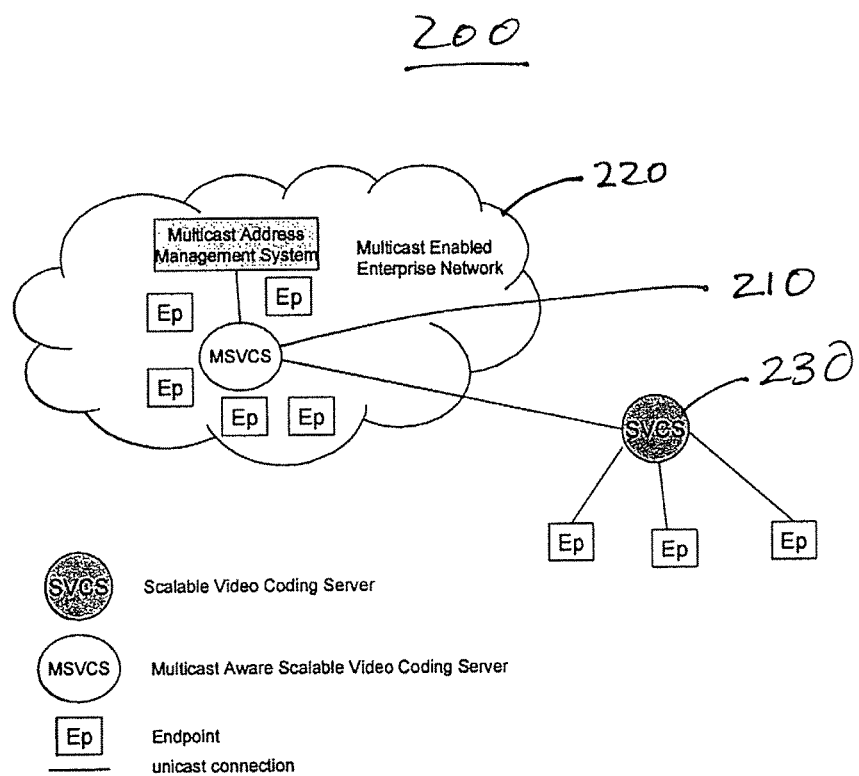
FIG. 2 is a schematic illustration of exemplary MSVCS operation on a multicast-enabled enterprise network, in accordance with the principles of the present invention.

For example, FIG. 2 shows a configuration 200 for a private or managed enterprise multicast solution 220, in which MSVCS 210, which is located at the enterprise intranet, is configured for the following services and features:

a) MSVCS 210 will use a set of multicast addresses, in either of the server-driven or endpoint-driven multicast configurations (or combinations thereof). In order to accomplish this, MSVCS 210 must be capable of cooperating with the intranet's existing IP multicast group address management system in order to properly reserve a multicast address for a conference session. The necessary communications between the address management system and MSVCS 210 can be carried out by means of site-specific protocols. Alternatively, MSVCS 210 can handle the multicast address allocations itself.

b) MSVCS 210 sends video data it receives from outside the enterprise network endpoints, SVCSs or other MSVCSs (e.g., SVCS 230) to the chosen multicast address to distribute the data internally via multicast. This operation is the same regardless of whether the originating MSVCS (e.g., SVCS 230) is performing server-driven or endpoint-driven multicast. In the latter case, the server MSVCS 210 is effectively bridging the two networks.

c. MSVCS 210 sends video data received from intranet clients to the external endpoints, SVCSs, or MSVCSs (e.g., SVCS 230).

d. MSVCS 210 on a multicast enabled network can act as a proxy in repairing lost packets by resending them to the endpoints or providing intraframes to start newly joined participants. (See e.g., error recovery services provided by MSVCS as described above).

Figure 3:
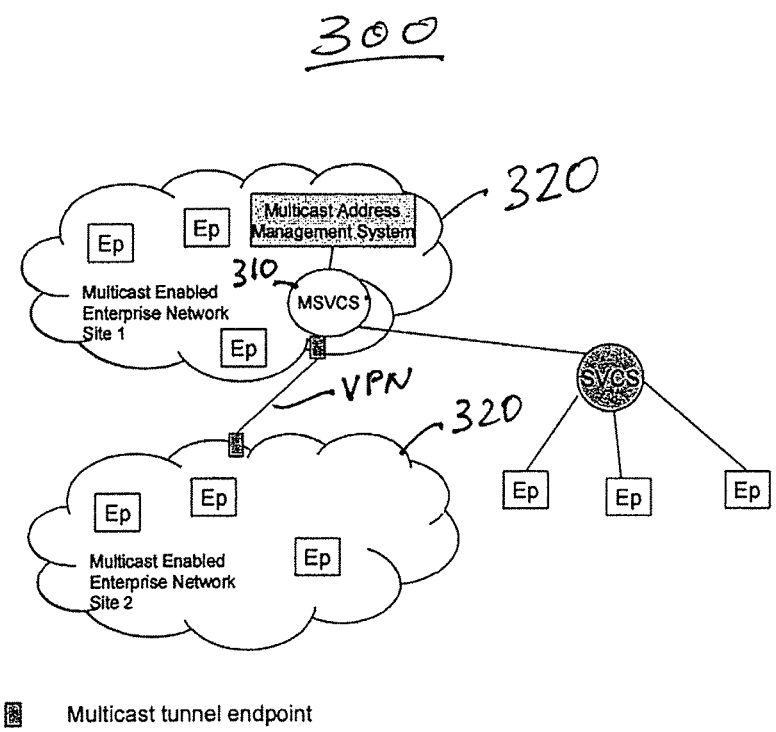
FIG. 3 is a schematic illustration of exemplary MSVCS operation on a multicast-enabled enterprise network with multiple locations, in accordance with the principles of the present invention.

FIG. 3 shows a configuration 300 for a private enterprise solution having multiple locations or sites 320 that are interconnected, e.g., via a virtual private network (VPN), and where the chosen multicast addresses run across the multiple sites in a tunneled fashion across the provider's backbone. In configuration 300, implementation of multipoint conferencing requires only a single MSVCS 310 at one of the locations that is capable of sending and receiving data using that multicast address.

Figure 4:
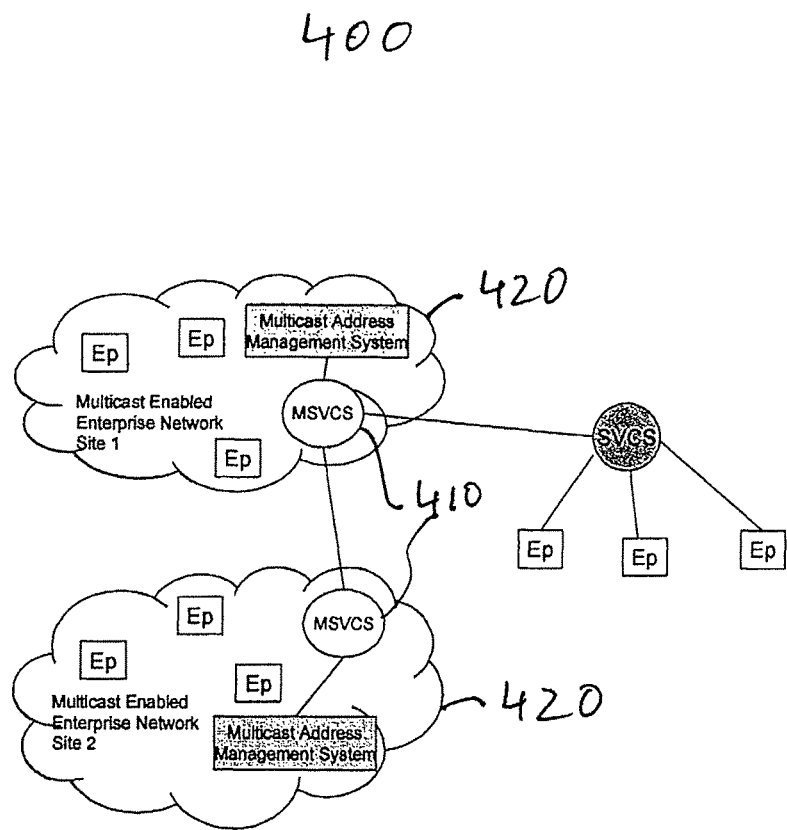
FIG. 4 is a schematic illustration of exemplary MSVCS operation on a multi-site enterprise network with local multicast, in accordance with the principles of the present invention.
Figure 5:
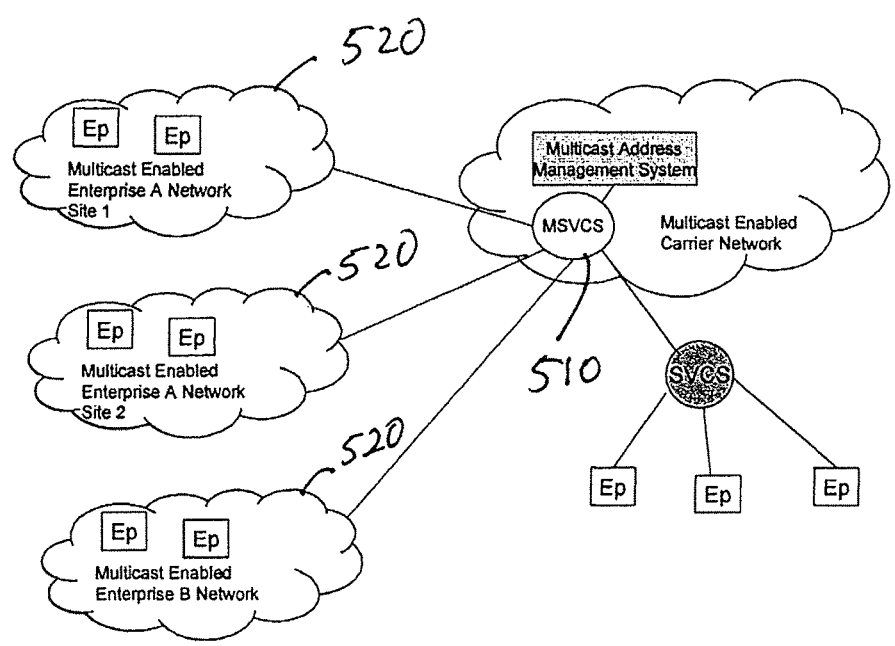
FIG. 5 is a schematic illustration of exemplary MSVCS operation on a carrier-managed multicast network, in accordance with the principles of the present invention.

FIGS. 4 and 5 show configurations 400 and 500, respectively, for managed enterprise solutions having multiple locations, which are not interconnected via a virtual private network (VPN), but are connected instead by a carrier's multicast-supported backbone network. In such cases, there will be a unique multicast address allocated by the carrier to each managed enterprise customer. The multicast addresses are reserved for multipoint video conferencing and multicasting within the enterprise's multiple sites. In such cases, implementation of multipoint conferencing will require either an MSVCS 410 located at each intranet site as shown in FIG. 4 or an MSVCS 510 located at the carrier's backbone network as shown in FIG. 5.

In configuration 400, the two MSVCS 410s at the different sites communicate with each other using unicast. The two MSVCS 410s can exchange configuration information, so that each of them can make appropriate decisions about rate control, statistical multiplexing, etc. Effectively, when converting data from multicast to unicast, MSVCS 410 acts as a proxy of the remote network and presents all the sources combined. MSVCS 410 also applies all intelligent rate control/shaping on the aggregate source by taking into account the link constraints. MSVCS 410 may perform error recovery functions on that link as well, in the same manner as is seen in standard SVCS procedures.

In configuration 500, MSVCS 510 can orchestrate multipoint video conferencing sessions set up across many managed enterprises 520, since each multicast conference session uses a unique set of multicast addresses across a managed enterprise's sites assigned by the carrier. If, as shown in FIG. 5, a multipoint video conference session is set up across several managed enterprise customers 520, the carrier may use a separate multicast address block for the inter-enterprise conferences, in which case, having MSVCS 510 hosted by the carrier may be advantageous.

Figure 6:
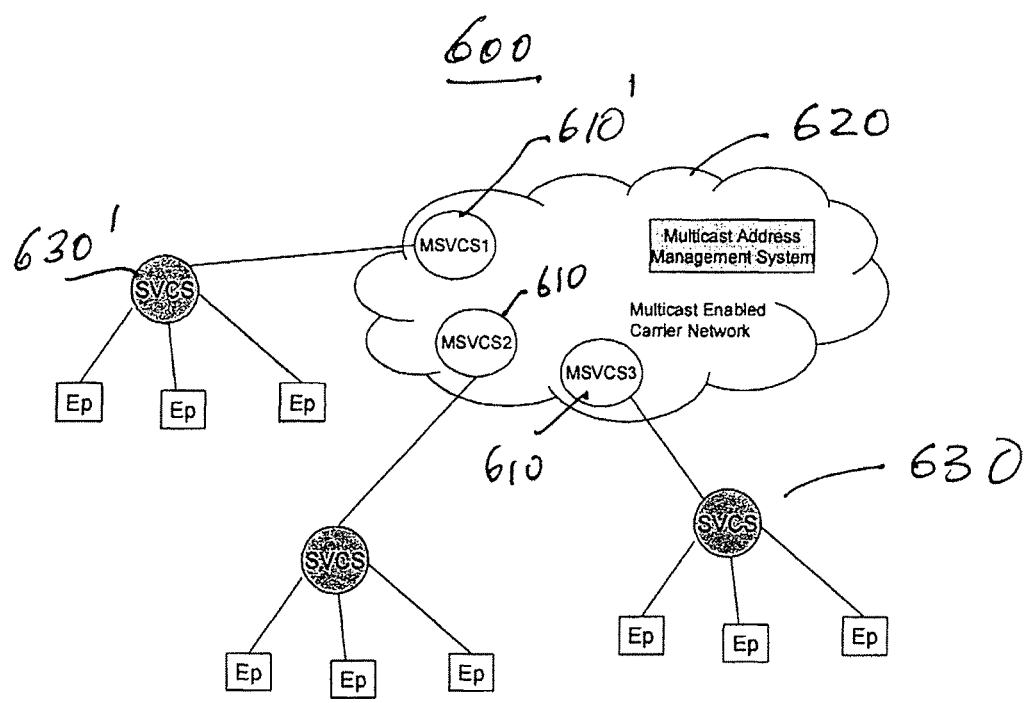
FIG. 6 is a schematic illustration of exemplary MSVCS operation on a multicast backbone with unicast enterprise networks, in accordance with the principles of the present invention.

Lastly, FIG. 6 shows configuration 600 for a scenario in which multicast is available in backbone network 620, but all enterprise networks 630 have no multicast support available. In this configuration, MSVCS 610 disposed in carrier network 620 can communicate with other MSVCS 610 using multicast. In doing so, various MSVCS 610 can act as proxies for enterprise 630 SVCS that are directly connected to them. For example, MSVCS 610' can multicast transmit the information it receives from SVCS 630'. MSVCS 610' also informs peer MSVCS 610s about the requirements of the endpoints connected to its associated SVCS 630' so that peer MSVCS 630s can make the correct decisions about which layers to transmit and to which multicast addresses.

In general, the MSVCS (or MSVCSs when there is more than one) should be positioned within the network in such a way so that a fast response to retransmission requests is possible to all participating endpoints. While unicast and multicast routes between two endpoints are not guaranteed to have significant common components, for a reasonably well-connected network with sufficient multicast router density, it is reasonable to assume that the computed multicast routes will traverse network points that offer a good balance (network distance) between the endpoints. It may therefore be advantageous if the MSVCS is co-hosted (i.e., operates on the same equipment), co-located, or very near (in network terms) to a multicast router. An additional benefit of such placement is that packets traveling from one endpoint to the others over a multicast communication channel do not have to be copied off the multicast router to reach the listening MSVCS across a secondary path that is not along the given or other multicast communication channel routes.

The configurations 200-600 shown in FIGS. 2-6 assume that the MSVCSs cooperate with existing IP multicast address management systems. However, there may be cases in which such address management systems do not exist or such cooperation is not feasible or practical. For such cases, the present invention provides the MSVCS with a mechanism for multicast address and connectivity discovery. The MSVCS may be configured to fully or partially discover (1) the available multicast address(es), and (2) the multicast topology (i.e., which clients are in a multicast IP address group).

In a discovery procedure, the configured MSVCS chooses a set of multicast IP addresses and sends them over unicast connections to all clients willing to participate in a multipoint conference. Each client is also assigned as the sender for only one of the multicast addresses in the set. The clients, then, send test packages to their assigned multicast address while listening for test packages coming from other clients on the entire set of multicast addresses. Each client, then, reports to the MSVCS its reception record, i.e., the list of multicast addresses from which they received test packets. This test procedure enables the MSVCS to generate a multicast connectivity diagram. The test procedure may be executed at the time of conference session establishment, allowing MSVCS the determine which clients can use multicast with each other.

Figure 7:
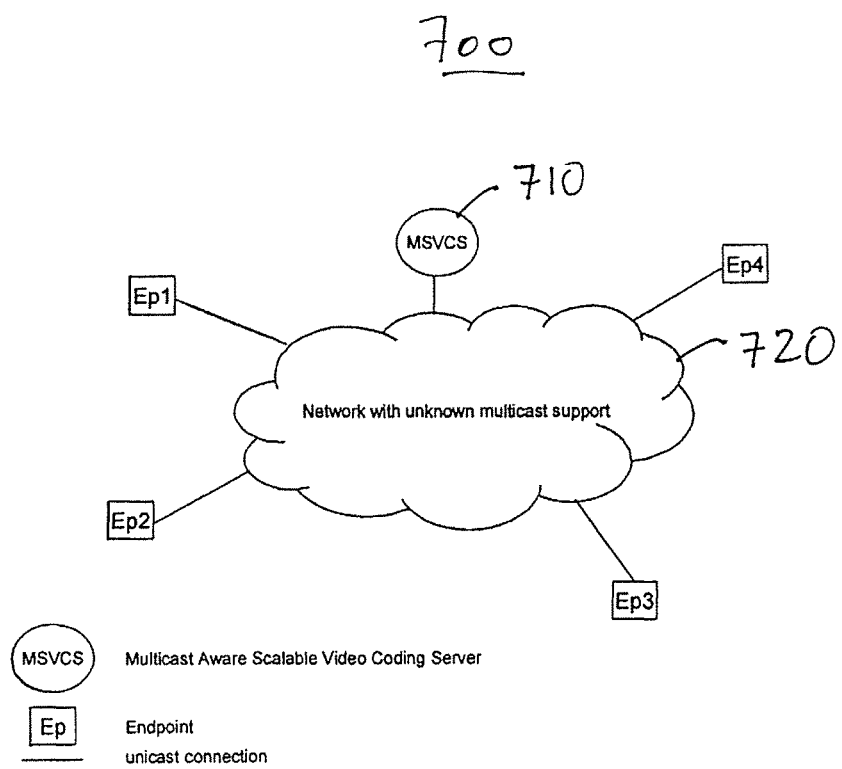
FIG. 7 is a schematic illustration of exemplary multicast connectivity discovery processes.

The operation of multicast connectivity discovery procedure can be understood with reference to system 700 shown in FIG. 7. System 700 includes a network 720 with unknown multicast support. For example, four endpoints Ep1-Ep4 may want to participate in a multipoint conference over network 720. Initially, MSVCS 710 is not aware of the multicast connectivity between these endpoints Ep1-Ep4. To start the discovery procedure, MSVCS 710 sends to each endpoint Ep1-Ep4 a suitable set of multicast addresses that it chooses. The choice of the addresses may be such that there is no overlap with other conferences MSVCS 710 is handling. MSVCS 710 also assigns a single endpoint as the sender for each address. One more multicast address is added to allow the MSVCS to participate in the discovery process. Hence the total number of addresses, in this example, is five addresses (e.g., "A", "B", "C", "D", and "E"). Without loss of generality, it may be assumed that the first endpoint Ep1 is chosen as the sender for the first multicast address A, the second endpoint Ep2 for B, etc., and the fifth address E is used by MSVCS 710. After receiving these address assignments, all endpoints and MSVCS 710 start to send predetermined test packets to their respective assigned address A, B, C, D, or E. Concurrently, all endpoints and MSVCS 710 listen to the other four addresses (i.e. they join and become members of the four multicast groups corresponding to the other four addresses). The test packets sent under the discovery procedure may carry a pre-determined signature so that they can be discriminated from other packets that may be sent to these multicast addresses by other machines or endpoints. After a pre-determined time period, which may be suitably selected to account for the time delays between the end-points participating in the session, each end-point EP1-Ep4 sends a list of addresses from which it has received test packets. Using this data, MSVCS 710 can, for example, prepare a reference table (e.g., table 800, FIG. 8).

In table 800, the notation "x" in a cell indicates that the end-point whose number is shown on the corresponding row header reported that it has received test packets at the multicast address shown on the column header. Usually, the multicast reception may be expected to be symmetric (i.e., if endpoint 1 hears endpoint 2, then endpoint 2 should also hear endpoint 1), and transitive (i.e., if endpoint 2 hears endpoint 1 and endpoint 3 hears endpoint 2, then endpoint 3 should also hear endpoint 1). However, these properties may not hold in all cases depending on the implementation of the multicast infrastructure. For the example presented in the table 800, MSVCS 710 can report that end-points 1, 2 and 4 can use bidirectional multicast for transmitting data to each other.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention. For example, the functionalities of an MSVCS describe herein can all be implemented in an SVC client as well. In which case, deployment of a separate MSVCS can be avoided.

It will be understood that in accordance with the present invention, the techniques described herein may be implemented using any suitable combination of hardware and software. The software (i.e., instructions) for implementing and operating the aforementioned rate estimation and control techniques can be provided on computer-readable media, which can include without limitation, firmware, memory, storage devices, microcontrollers, microprocessors, integrated circuits, ASICs, on-line downloadable media, and other available media.

The invention claimed is:

1. A multi-endpoint video conferencing system, wherein audiovisual signals are scalably coded into layers including a base layer and one or more enhancement layers, the conferencing system comprising: a plurality of endpoints that individually can receive and/or transmit scalable audiovisual signals; a multicast scalable video communication server (MSVCS) linked to each of the endpoints by a corresponding unicast communication channel; a communication network that provides a plurality of multicast communication channels linking the endpoints and the MSVCS, wherein the endpoints are configured to transmit their individual audiovisual signal layers to other endpoints and the MSVCS using the plurality of multicast communication channels, and wherein the MSVCS is configured to cache audiovisual signal data received over the plurality of multicast communication channels from the plurality of the endpoints, and retransmit the cached data over a unicast communication channel to an endpoint that requests the cached audiovisual signal data over its unicast communication channel.

2. The system of claim 1, wherein endpoints perform rate matching and resolution selection for personalized layout for received audiovisual signal data from another endpoint by joining specific multicast communication channel groups that are used for transmission by the other endpoint.

3. The system of claim 1, wherein the MSVCS is further configured to perform the functions of a multicast router.

4. The system of claim 1, further comprising at least one endpoint which is linked to the MSVCS only over a unicast communication channel and which does not have access to any multicast communication channel, wherein the MSVCS is further configured to operate as an SVCS or Compositing SVCS for transmitting data from multicast-enabled endpoints to the at least one endpoint that is linked only over a unicast communication channel and, conversely, transmit audiovisual data received from that endpoint to the multicast-enabled endpoints using corresponding multicast communication channels.

5. The system of claim 1, wherein the MSVCS is further configured to identify if any multicast communication channels are available to and between the endpoints by first assigning one multicast communication channel group address to each of the endpoints and transmitting all the assignments to each endpoint over its corresponding unicast communication channel, so that the endpoints can join all the assigned multicast communication channel group addresses and each endpoint can transmit a test packet to the multicast communication channel group address assigned to it, and report after a period of time to the MSVCS the list of other endpoints or multicast communication channel group addresses from which they have received test packets.

6. A multi-endpoint video conferencing system, wherein audiovisual signals are scalably coded into layers including a base layer and one or more enhancement layers, the conferencing system comprising: a plurality of endpoints that individually can receive and transmit scalable audiovisual signals; a multicast scalable video communication server (MSVCS) linked to each of the endpoints by one or more corresponding unicast communication channels; a communication network that provides a plurality of multicast communication channels linking the MSVCS to the endpoints, wherein the endpoints are configured to transmit their individual audiovisual signal layer data to the MSVCS using their corresponding unicast communication channels, and wherein the MSVCS is configured to retransmit received audiovisual signal layer data to the endpoints over the plurality of multicast communication channels.

7. The system of claim 6, wherein endpoints perform rate matching and resolution selection for personalized layout for received data from the other endpoints by joining specific multicast communication channel groups that are used for transmission by the MSVCS.

8. The system of claim 6, wherein the MSVCS is further configured to cache audiovisual signal data received from the plurality of the endpoints, and retransmit the data over a unicast communication channel to an endpoint that requests the cached audiovisual signal data over its corresponding unicast communication channel.

9. The system of claim 6, wherein the MSVCS is configured, prior to creating the output video signal that is forwarded to a receiving endpoint, to selectively eliminate or modify portions of input video signals received from transmitting endpoints that correspond to layers higher than the base spatial or quality layer, and explicitly code or signal use of lower spatial or quality layer data in the output video signal.

10. The system of claim 6, wherein the MSVCS is further configured to perform the functions of a multicast router.

11. The system of claim 6, further comprising at least one endpoint which is linked to the MSVCS only over a unicast communication channel and which does not have access to any multicast communication channel, wherein the MSVCS is further configured to operate as an SVCS or Compositing SVCS for transmitting data from the multicast-enabled endpoints to the at least one endpoint that is linked only over a unicast communication channel and, conversely, transmit audiovisual data received from that endpoint to the multicast-enabled endpoints using corresponding multicast communication channels.

12. The system of claim 6, wherein the MSVCS is further configured to identify if any multicast communication channels are available to the endpoints by selecting a multicast communication channel group address and transmitting it to all the endpoints over their corresponding unicast communication channels, so that the endpoints can join the selected multicast communication channel group address, and report after a period of time to the MSVCS if they have received a test packet transmitted by the MSVCS to the selected multicast communication channel group address.

13. A method for operating a multi-endpoint video conferencing system, wherein audiovisual signals are scalably coded into layers including a base layer and one or more enhancement layers, the conferencing system comprising: a plurality of endpoints that individually can receive and/or transmit scalable audiovisual signals; a multicast scalable video communication server (MSVCS) linked to each of the endpoints by a corresponding unicast communication channel; a communication network that provides a plurality of multicast communication channels linking the endpoints and the MSVCS, the method comprising: transmitting by the endpoints their individual audiovisual signal layers to other endpoints and the MSVCS using the plurality of multicast communication channels; at the MSVCS, caching audiovisual signal data received over the plurality of multicast communication channels from the plurality of the endpoints; and retransmitting cached data over a unicast communication channel to an endpoint that requests the cached audiovisual signal data over its unicast communication channel.

14. The method of claim 13, further comprising, at an endpoint, performing rate matching and resolution selection for personalized layout for received audiovisual signal data from another endpoint by joining specific multicast communication channel groups that are used for transmission by the another endpoint.

15. The method of claim 13, further comprising using the MSVCS to perform the functions of a multicast router.

16. The method of claim 13, wherein at least one endpoint which is linked to the MSVCS only over a unicast communication channel and which does not have access to any multicast communication channel, the method further comprising: operating the MSVCS as an SVCS or Compositing SVCS for transmitting data from multicast-enabled endpoints to the at least one endpoint that is linked only over a unicast communication channel; and conversely, transmitting audiovisual data received from that endpoint to the multicast-enabled endpoints using corresponding multicast communication channels.

17. The method of claim 13, further comprising: using the MSVCS to identify if any multicast communication channels are available to and between the endpoints by first assigning one multicast communication channel group address to each of the endpoints and transmitting all the assignments to each endpoint over its corresponding unicast communication channel, so that the endpoints can join all the assigned multicast communication channel group addresses and each endpoint can transmit a test packet to the multicast communication channel group address assigned to it, and report after a period of time to the MSVCS the list of other endpoints or multicast communication channel group addresses from which they have received test packets.

18. A method for operating a multi-endpoint video conferencing system, wherein audiovisual signals are scalably coded into layers including a base layer and one or more enhancement layers, the conferencing system comprising: a plurality of endpoints that individually can receive and transmit scalable audiovisual signals; a multicast scalable video communication server (MSVCS) linked to each of the endpoints by one or more corresponding unicast communication channels; a communication network that provides a plurality of multicast communication channels linking the MSVCS to the endpoints, the method comprising: at the endpoints, transmitting their individual audiovisual signal layer data to the MSVCS using their corresponding unicast communication channels; and at the MSVCS retransmitting received audiovisual signal layer data to the endpoints over the plurality of multicast communication channels.

19. The method of claim 18, wherein endpoints perform rate matching and resolution selection for personalized layout for received data from the other endpoints by joining specific multicast communication channel groups that are used for transmission by the MSVCS.

20. The method of claim 18, further comprising: at the MSVCS, caching audiovisual signal data received from the plurality of the endpoints; and retransmitting the data over a unicast communication channel to an endpoint that requests the cached audiovisual signal data over its corresponding unicast communication channel.

21. The method of claim 18, further comprising: prior to creating the output video signal that is forwarded to a receiving endpoint, using the MSVCS to selectively eliminate or modify portions of input video signals received from transmitting endpoints that correspond to layers higher than the base spatial or quality layer; and explicitly coding or signaling use of lower spatial or quality layer data in the output video signal.

22. The method of claim 18, further comprising using the MSVCS to perform the functions of a multicast router.

23. The method of claim 18, wherein at least one endpoint is linked to the MSVCS only over a unicast communication channel and does not have access to any multicast communication channel, the method further comprising operating the MSVCS as an SVCS or Compositing SVCS for transmitting data from multicast-enabled endpoints to the at least one endpoint that is linked only over a unicast communication channel and, conversely, transmitting audiovisual data received from that endpoint to the multicast-enabled endpoints using corresponding multicast communication channels.

24. The method of claim 18, further comprising using the MSVCS to identify if any multicast communication channels are available to the endpoints by selecting a multicast communication channel group address and transmitting it to all the endpoints over their corresponding unicast communication channels, so that the endpoints can join the selected multicast communication channel group address, and report after a period of time to the MSVCS if they have received a test packet transmitted by the MSVCS to the selected multicast communication channel group address.

25. Non-transitory computer readable media comprising a set of instructions to direct a processor to perform the method recited in at least one of the method claims 13-24.

\* \* \* \* \*

UNITED STATES PATENT AND TRADEMARK OFFICE
CERTIFICATE OF CORRECTION

PATENT NO. : 8,502,858 B2  Page 1 of 1
APPLICATION NO. : 11/865478
DATED : August 6, 2013
INVENTOR(S) : Mehmet Reha Civanlar et al.

It is certified that error appears in the above-identified patent and that said Letters Patent is hereby corrected as shown below:

Title Page item (75) Inventor: Mehaet Reha Civanlar, San Francisco, CA should read -- Mehmet Reha Civanlar, San Francisco, CA --

Signed and Sealed this
Seventeenth Day of September, 2013

Teresa Stanek Rea
*Deputy Director of the United StatesPatent and Trademark Office*